(12) United States Patent
Boutaghou et al.

(10) Patent No.: US 6,243,222 B1
(45) Date of Patent: Jun. 5, 2001

(54) LOAD/UNLOAD METHOD FOR SLIDERS IN A HIGH SPEED DISK DRIVE

(75) Inventors: Zine Eddine Boutaghou, Vadnais Heights; Dallas Wayne Meyer, Burnsville, both of MN (US)

(73) Assignee: Seagate Technology, INC, Scotts Valley, CA (US)

( * ) Notice: Subject to any disclaimer, the term of this patent is extended or adjusted under 35 U.S.C. 154(b) by 0 days.

(21) Appl. No.: 09/272,424

(22) Filed: Mar. 19, 1999

Related U.S. Application Data
(60) Provisional application No. 60/078,842, filed on Mar. 20, 1998.

(51) Int. Cl.[7] .............................. G11B 19/20; G11B 5/54
(52) U.S. Cl. ..................................... 360/73.03; 360/254.7
(58) Field of Search ............................. 360/73.01, 73.03, 360/235.4, 236.6, 235.8, 234.3, 254.7, 254.9, 255.6–255.9

(56) References Cited
U.S. PATENT DOCUMENTS

| | | | |
|---|---|---|---|
| 4,141,049 | * | 2/1979 | Watrous ................................ 360/103 |
| 4,384,311 | * | 5/1983 | McNeil ................................ 360/128 |
| 4,839,756 | * | 6/1989 | Chew et al. ........................... 360/105 |
| 5,077,713 | * | 12/1991 | Takizawa et al. ..................... 369/13 |
| 5,079,652 | * | 1/1992 | Ishida et al. ........................... 360/75 |
| 5,303,099 | * | 4/1994 | Kawazoe ............................... 360/103 |
| 5,615,064 | * | 3/1997 | Blank et al. ........................... 360/75 |
| 5,825,575 | * | 10/1998 | Lee ....................................... 360/75 |
| 5,870,255 | * | 2/1999 | Hornung et al. ..................... 360/105 |
| 5,959,814 | * | 9/1999 | Mallary et al. ...................... 360/135 |
| 6,081,400 | * | 6/2000 | Lu et al. ................................ 360/75 |

FOREIGN PATENT DOCUMENTS

| | | | |
|---|---|---|---|
| 0 644 534A1 | * | 3/1995 | (EP) . |
| 4-060959 | * | 2/1992 | (JP) . |
| 4-325960 | * | 11/1992 | (JP) . |
| 4-355264 | * | 12/1992 | (JP) . |
| 6-119732 | * | 4/1994 | (JP) . |
| 9-265616 | * | 10/1997 | (JP) . |
| 10-261214 | * | 9/1998 | (JP) . |

* cited by examiner

*Primary Examiner*—William Klimowicz
(74) *Attorney, Agent, or Firm*—Schwegman, Lundberg, Woessner & Kluth, P.A.

(57) ABSTRACT

An information handling system, such as a disk drive, includes a base, a disk stack rotatably attached to the base, and an actuator assembly movably attached to the base. The actuator assembly also includes a load spring and a slider attached to said load spring. A ramp is also attached to the base near the disk stack. The ramp is used to load and unload the sliders to and from the disk. The slider and load spring are attached to form a gimballing connection between the slider and the load spring. The disk drive also includes a spindle motor and spindle motor controller for rotating the disk at a first rotational velocity and for rotating the disk at a second rotational velocity. The slider includes an air bearing surface. Landing pads, made of a durable material such as diamond like carbon, are formed on the air bearing surface of the slider. A method for loading a slider from a ramp to a disk surface includes rotating the disk at a first rotational velocity, as the slider is loaded. The disk is rotated at a second rotational velocity after the slider is positioned over the disk. The first rotational velocity is slower than the second rotational velocity so that damage due to contact between the disk and slider is minimized.

18 Claims, 9 Drawing Sheets

LOAD/UNLOAD METHOD FOR SLIDERS IN A HIGH SPEED DISK DRIVE

RELATED APPLICATION

This application claims the benefit of U.S. Provisional Application Ser. No. 60/078,842, filed Mar. 20, 1998 under 35 USCI 19(e).

FIELD OF THE INVENTION

The present invention relates to the field of mass storage devices. More particularly, this invention relates to a loading and unloading sliders in a high performance disk drive.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high revolutions per minute ("RPM"). These days common rotational speeds are 7200 RPM. Rotational speeds in high performance disk drives are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The slider has an air bearing surface ("ABS") which includes rails and a cavity between the rails. The air bearing surface is that portion of the slider that is nearest the disk as the disk drive is operating. When the disk rotates, air is dragged between the rails and the disk surface causing pressure, which forces the head away from the disk. At the same time, the air rushing past the depression in the air bearing surface produces a negative pressure area at the depression. The negative pressure or suction counteracts the pressure produced at the rails. The different forces produced counteract and ultimately fly over the surface of the disk at a particular fly height. The fly height is the thickness of the air lubrication film or the distance between the disk surface and the head. This film eliminates the friction and resulting wear that would occur if the transducing head and disk were in mechanical contact during disk rotation.

The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 1–2 microinches. In some disk drives, the ceramic block does not fly on a cushion of air but rather passes through a layer of lubricant on the disk. A flexure is attached to the load spring and to the slider. The flexure allows the slider to pitch and roll so that the slider can accommodate various differences in tolerance and remain in close proximity to the disk.

Information representative of data is stored on the surface of the memory disk. Disk drive systems read and write information stored on tracks on memory disks. Transducers, in the form of read/write heads attached to the sliders, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

One of the most critical times during the operation of a disk drive occurs just before the disk drive shuts down or during the initial moment when the disk drive starts. When shutdown occurs, the small ceramic block or slider is typically flying over the disk at a very low height. In the past, the small block or slider was moved to a non-data area of the disk where it literally landed and skidded to a stop. Problems arise in such a system. Such a system is adequate for disk drives that had textured disk surfaces and which rotated at less than 7200 Revolutions Per Minute ("RPM"). To improve magnetic performance, disks now are formed with a smooth surface. To improve access times, disk stacks are now rotated at speeds of 10,000 RPM in a high performance disk drive. Stiction, which is static friction, occurs between the air bearing surface of the slider and the smooth disk surface. Forces from stiction, in some instances, can be high enough to separate the slider from the suspension. When the disk is rotated at 10,000 RPM, the velocity between the slider and disk is high. At high velocity, the kinetic energy that must be disappated when a contact between the disk and slider occurs is so high that particle generation is a distinct possibility. Still another problem is that landing a slider on the disk may limit the life of the disk drive. Each time the drive is turned off another contact start stop cycle occurs subjecting the slider to another high impact force which may cause the slider to chip or generate particles. The generated particles could eventually cause a head crash in the disk drive.

To overcome the stiction problem and to provide for a much more rugged design for disk drives used in mobile computers, such as portable computers and notebook computers, disk drive designers began unloading the sliders onto a ramp positioned on the edge of the disk. Disk drives with ramps are well known in the art. U.S. Pat. No. 4,933,785 issued to Morehouse et al. is one such design. Other disk drive designs having ramps therein are shown in U.S. Pat. Nos. 5,455,723, 5,235,482 and 5,034,837. A portion of the ramp is positioned over the disk. Before power is actually shut off, the actuator assembly moves the suspension, slider and transducer to a park position on the ramp. Commonly, this procedure is referred to as unloading the heads. Unloading the heads helps to insure that data on the disk is preserved since, at times, unwanted contact between the slider and the disk results in data loss on the disk. When starting up the disk drive, the process is reversed. In other words, the suspension and slider are moved from the ramp onto the surface of the disk and into a transducing position. This is referred to as loading the heads or sliders onto the disk.

Use of a ramp to load and unload the disk overcomes many aspects of the stiction problem. However, during the loading process and the unloading process, it seems that it is fairly common for the slider to contact the disk. In such situations, high friction forces can develop between the head and the disk. The high friction forces can cause slider and media damage. The contact with the disk in the disk stack rotated at 10,000 RPM or higher still has the potential to cause damage. Some manufacturer's simply sacrifice the portion of the disk at the outer diameter and devoted that space for loading and unloading to and from the disk. In other words, data is not kept at the outer diameter of the disk so that if disk contact occurs there is no possibility of losing data from damage to the disk. This design strategy is suboptimal. First of all, the area of the disk where the most information representative of data can be stored is the outer diameter of the disk. Giving up the outer diameter is like giving up the best located and most valuable real estate when developing a parcel of land. In addition, slider and disk contact will still occur and this could eventually generate particles and cause a disk crash. The damage is greater at higher rotational speeds of the disks in the disk drives. Thus, this problem will only get worse as higher RPM design points are set.

What is needed is a method for loading the sliders onto the disk without causing damage to the disk. What is further needed is a method for loading the sliders onto the disk without causing damage to the heads. Also needed is a method for avoiding contact or for controlling the parameters which determine the severity of the contact between the disk and the slider so that the amount of damage resulting from a contact will be minimal. Also needed is a system which is easy to manufacture and a system that also does not require adjustment. The system must also be rugged and stable over time. In other words, the system must be able to last for the life of the drive. The system must also be made of materials with minimal outgassing properties so that contaminants will not be added to the disk drive enclosure or contaminant the lubricant on the disk. The system must also provide gimballing of the slider with respect to the suspension.

SUMMARY OF THE INVENTION

An information handling system, such as a disk drive, includes a base, a disk stack rotatably attached to the base, and an actuator assembly movably attached to the base. The actuator assembly also includes a load spring and a slider attached to said load spring. A ramp is also attached to the base near the disk stack. The ramp is used to load and unload the sliders to and from the disk. The slider and load spring are attached to form a gimballing connection between the slider and the load spring. The disk drive also includes a spindle motor and spindle motor controller for rotating the disk at a first rotational velocity and for rotating the disk at a second rotational velocity. The slider includes an air bearing surface. Landing pads, made of a durable material such as diamond like carbon, are formed on the air bearing surface of the slider. A method for loading a slider having landing pads on the air bearing surface of the slider from a ramp to a disk surface includes rotating the disk at a first rotational velocity, moving the slider from the ramp to the disk surface, and rotating the disk at a second rotational velocity. The first rotational velocity is slower than the second rotational velocity so that damage due to contact between the disk and slider is minimized. The first rotational velocity generates a cushion of air between the air bearing surface of the slider and the disk so that the landing pads interfere with the disk rather than the body of the slider. The method of claim 2 wherein the first rotational velocity ranges between 150 RPM to 1000 RPM. Once the slider is loaded onto the disk, the disk speed is taken to the second velocity which is generally the operational velocity where the slider flies or passes over the disk in transducing relation.

Advantageously, the method described above allows for loading the sliders onto the disk without causing damage to the disk, damage to the slider, particle generation or immediate or eventual head crashes. The method either avoids contact or minimizes the potential damage from contact by controlling the parameters which determine the severity of the contact between the disk and the slider. As a consequence, the amount of damage resulting from a contact is minimized. The slider is also provided with landing pads made of a durable material and shaped so that stiction between the major portion of the air bearing surface and the disk is minimized. The shape of the landing pads also eliminates damage to the disk surface. Advantageously, the landing pads are made of diamond like carbon. Diamond like carbon is easy deposited onto the air bearing surface of the slider. In addition, diamond like carbon is rugged and stable over time and is capable of lasting for the life of the drive. Diamond like carbon has minimal outgassing properties so that contaminants will not be added to the disk drive enclosure or contaminant the lubricant on the disk. The landing pads do not affect the gimballing of the slider with respect to the suspension.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
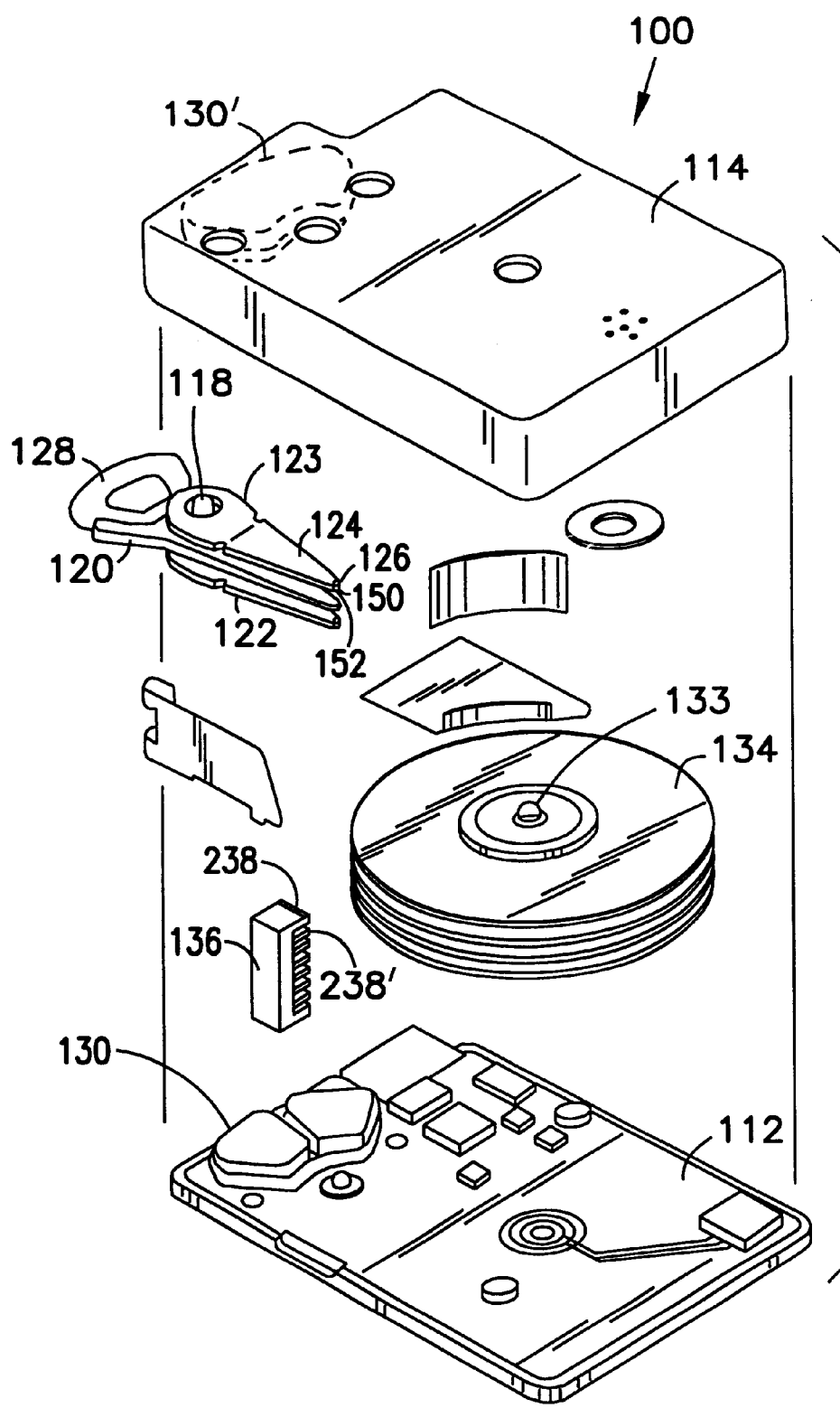
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a load tang 152. The load tang 152 is used for loading sliders 126 to the disk 134 and unloading the sliders 126 from the disk. On the end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
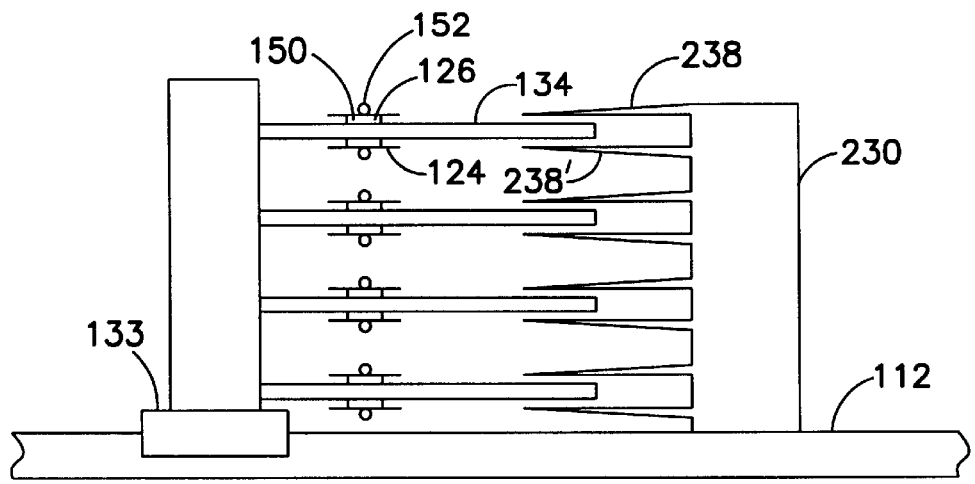
FIG. 2 is a side view of a disk drive having a ramp structure.

Also attached to the base 112 is a ramp structure 136. FIG. 2 is a side view of a disk drive having a ramp structure. Now looking at FIG. 2, the ramp structure will be described in more detail. The ramp structure 136 has a plurality of individual ramps 238 and 238'. One ramp is associated with each surface of the disk. As shown, there is a ramp portion 238 for the top surface of a disk and a ramp 238' for a bottom surface of the disk 134. The ramp portion 238 is for the loading and unloading the transducer from the top surface of a disk 134 and the ramp portion 238' is for loading and unloading a transducer from the bottom surface of a disk 134. The disk drive shown in FIG. 2 has four disks. Each disk 134 has two surfaces so there are a total of eight disk surfaces within the disk drive shown. Only one disk and set of ramps 238 and 238' are labeled. The other disks and ramps are similar to the labeled disk 134 and set of ramps 238 and 238'. The ramp structure 136 shown in FIG. 2 is fixed to the base of the disk drive. The ramp structure can be formed as one unitary part or can be assembled from a number of different parts. For example, the ramp structure 134 shown could be comprised of four parts. Each part would include a set of ramps 238 and 238' and a main body 230 to which the ramps 238 and 238' are attached. A portion of each of the ramp portions 238 and 238' of the ramp is positioned over the disk 134. It should be noted that this invention could also be used on ramps that rotate in and out of a load/unload position.

Also shown in FIG. 2 are the load springs 124, which are referred to by some as load beams or suspensions, and the attached load tangs 152. The load tangs 152 are attached to the load springs 124. The slider 124 and transducer 150 carried by the slider are not illustrated in FIG. 2 for the sake of clarity. All the load springs 124 and tangs 152 are attached to the actuator. Moving the actuator assembly 120 moves all the load springs 124 and load tangs 152. In operation, the actuator assembly 120 is moved to a park position when the disk drive is powered down. Moving the actuator to the park position causes the load tangs 152 associated with each load spring 124 to ride up the ramp 238 or 238' associated with the surface of the disk 134. This is referred to as unloading the disk. When the disk drive is powered on, the actuator moves to an operating position by moving the load springs 124, load tangs 152, sliders and transducers off their respective ramps 238 or 238' into a transducing position over the surface of the disk 134. This is referred to as loading the disk. The load springs 124, load tangs 152 sliders 124 and transducers 150 of the disk drive are shown in a transducing position in FIG. 2. It should be noted that much of the actuator assembly 120 has been eliminated from FIG. 2 for the sake of clarity.

Figure 3:
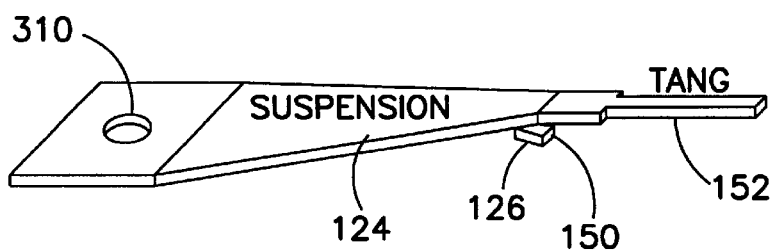
FIG. 3 is a perspective view of a load beam and load tang.

FIG. 3 is a perspective view of a load spring 124 and tang 152. The load spring 124 is a triangular structure which acts as a cantilevered spring to place a small load onto the slider 126 when the slider 126 is in transducing relationship with the disk 134. The load spring 124 is attached at its wider end to an actuator arm 123. The load spring 124 shown in FIG. 3 has a swage opening 310 and a swage plate 312 in the wider end. The swage opening 310 and swage plate 312 are used to attach the load spring 124 by a process referred to as swaging. Other attachment methods may also be used without departing from the spirit of this invention. The tang 152 is attached to a free end 320 of the load spring 124. The tang 152 is shown as an elongated cylinder. Also attached to the load spring 124 is the slider 126. The transducer 150 is carried by or within the slider 126. The tang 152 includes a gimbal dimple 600.

Figure 4:
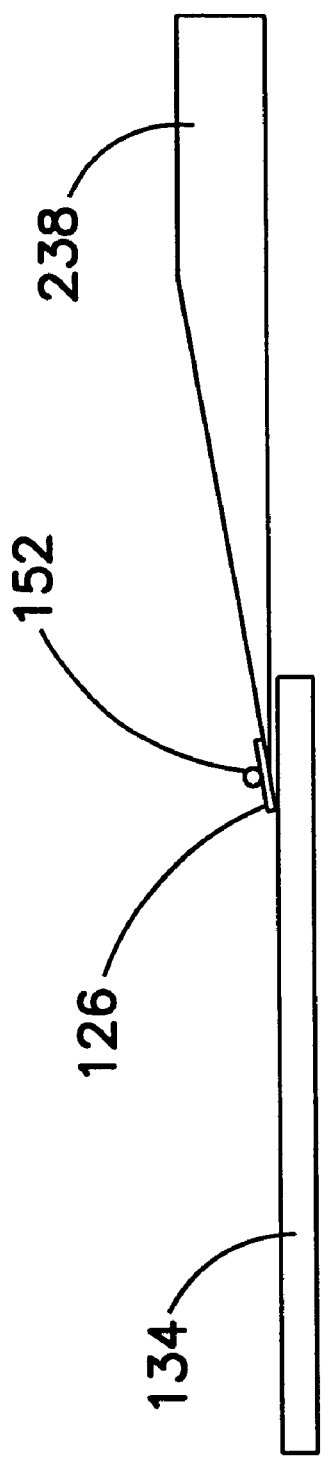
FIG. 4 is a end view of a slider on the tip of the ramp structure.

FIG. 4 is an end view of the slider 126 at the tip of the ramp structure 238. This is the position of the slider 126 either during loading of the slider 126 from the ramp 238 onto the disk or during unloading of the slider from the disk 134. During unloading, the slider 126 is removed from the surface of the disk 134 and parked on the ramp 238. As can be seen, the slider tilts or rolls either during loading or unloading of the slider when a ramp is used.

Figure 5:
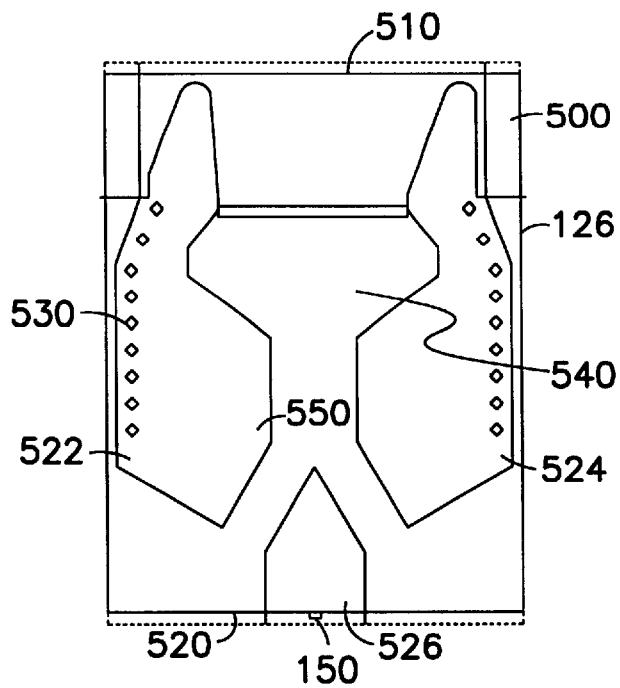
FIG. 5 is a bottom view of the slider showing the air bearing surface of a first slider.

FIG. 5 is a bottom view of a slider 126 showing an air-bearing surface 500 of the slider 126. The slider 126 also has a leading edge 510 and a trailing edge 520 as well as a first side rail 522, a second side rail 524 and a center island 526. The transducer 150 is housed within the center island 526 of the air-bearing surface 500. The air-bearing surface 500 and specifically the first side rail 522 and second rail 524 include a plurality of landing pads 530. Each landing pad is essentially the same so therefore only one will be described in further detail. The landing pads are farmed of a rugged, durable material which has the ability to contact the disk 134 without causing damage thereto, especially when the rotational speed of the disk is at a level which is substantially below the operating speed for rotating the disk 134. The pads are typically made of diamond-like carbon ("DLC"). Diamond-like carbon or DLC has the ability to contact the media without causing wear and also contact media without causing producing detectable wear to the pad. At 300 revolutions per minute ("RPM") a series of drag tests equivalent to one million load and unload cycles showed no detectable pad wear or media wear when using landing pads 530 made of DLC. The landing pads are typically deposited onto the surface of the air-bearing 500 and specifically onto the surface of the first rail 522 and the second side rail 524. The landing pads 530 have a height in the range of 80 to 250 Angstroms. With landing pads 530 having a height in the above-stated range, the sliders do not rest on the disk 134. In other words, when the slider 126 contacts the disk 134 the landing pads 530 are what is in contact rather than a major portion of the air-bearing surface 500 of the slider 126. The pads 530 are positioned on the air-bearing surface 500 of the slider 126 so that the major portions of the air-bearing surface are not in contact with the disk 134. In this particular instance, the slider 126 shown in FIG. 5 has a low crown. The crown is the central region near a cavity 540 formed between the side rails 522 and 524 and the center island 526. The crown carries a reference numeral 550 in FIG. 5. With a low crown 550 the pads 530 which are positioned near the outer edge of the first side rail 522 and the second side rail 524 are sufficient to keep the main portion of the slider body from contacting the disk 134.

Figure 6:
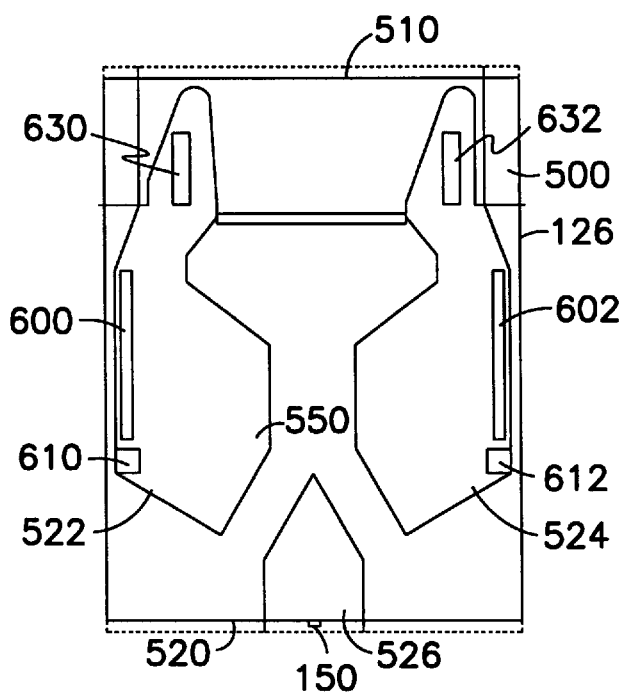
FIG. 6 is a bottom view of the slider showing the air bearing surface of a second slider.

FIG. 6 is a bottom view of a slider 126 showing the air-bearing surface 500. The slider shown in FIG. 6 also has a low crown 550. Most of the elements of the air-bearing surface 500 in FIG. 5 are the same as the elements of the air-bearing surface 500 in FIG. 6. Common elements share common reference numerals. Rather than describe the entire air-bearing surface of FIG. 6, the discussion of FIG. 6 will key in on the differences between FIG. 5 and FIG. 6. The main difference between the air-bearing surface in FIG. 5 and the air-bearing surface in FIG. 6 is that the air-bearing surface of FIG. 6 has several types of landing pads. Each of the first side rail 522 and the second rail 524 has a set of three different landing pads. The side rail 522 includes an elongated landing pad 600 which is positioned near the outer edge of the side rail 522. A square landing pad 610 is positioned toward the edge of the side rail 522 which is near the outer edge of the slider 126. The square landing pad 610 is also positioned on the side rail 522 near the trailing edge 520 of the slider 126. A rectangular landing pad 630 is positioned on the side rail 522. The rectangular landing pad 630 is centered on the side rail 522 and is positioned close to the leading edge 510 of the slider 126. The air-bearing surface 500 of the slider 126 shown in FIG. 6 is symmetrical and therefore similar pads are positioned similarly on the second side rail 524. An elongated landing pad 602 is positioned along the edge of side rail 524, a square landing pad 612 is positioned near the edge of the side rail and near the trailing edge 520 of the slider 126, and a rectangular landing pad 632 is centered on the side rail 524 near the leading edge 510 of the slider 126 shown in FIG. 6. As mentioned previously the slider 126 has a low crown 550 and the landing pads 610, 612, 600, 602, 630 and 632 are positioned so that the main portion of the air-bearing surface 500 does not contact the disk 134 when positioned over the disk. Rather the landing pads 600, 602, 610, 612, 630 and 632 contact the disk surface when the slider 126 is positioned or contacts the disk 134.

Figure 7:
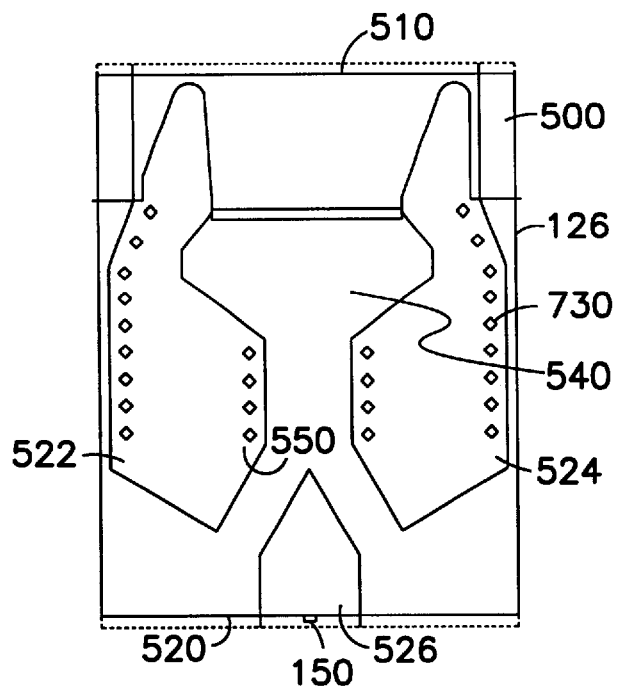
FIG. 7 a bottom view of the slider showing the air bearing surface of a third slider.
Figure 8:
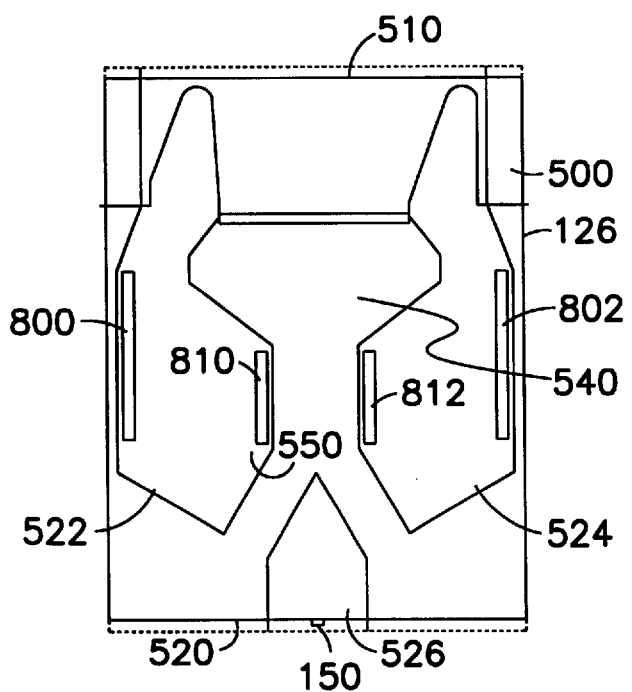
FIG. 8 a bottom view of the slider showing the air bearing surface of a fourth slider.

FIGS. 7 and 8 show a slider having a high crown 550 on the air-bearing surface 500. FIG. 7 is a bottom view of the slider 126 showing the air-bearing surface 500 of one slider. The slider has landing pads 730 which are positioned near the outer edge of each of the first side rail 522 and the second side rail 524. The pads 730 are also positioned on each of the side rails 522 and 524 near the cavity 540 of the air-bearing surface. In other words, the pads 730 positioned near the cavity 540 on the first side rail 522 and the second side rail 524 are positioned so that the high crowned portion 550 of the air-bearing surface 500 does not contact the disk 134 when the slider 126 is in contact with the disk. Rather than having the main portion of the air-bearing surface in contact with the disk, the landing pads 730 are in contact with the disk 134.

FIG. 8 is a bottom view of a slider 126 having a higher crown 550 on the air-bearing surface 500. To assure that the high-crown portion 550 of the air-bearing surface 500 does not contact the disk when the slider 126 contacts the disk. Each of the first side rail 522 and the second side rail 524 carries a pair landing pads. Looking first at side rail 522, the side rail 522 includes an elongated pad 800 which is positioned near the outer edge of the slider. The first side rail 522 also includes a shorter rectangular pad which is positioned near the cavity 540 of the air-bearing surface 500. The rectangular pad 810 is also positioned in the area of the high crown 550. Similarly the second side rail 524 includes an elongated landing pad 802 which is positioned near the outer edge of the slider 126 and also includes a rectangular pad 812 which is positioned on the side rail 524 near the cavity 540 on the air-bearing surface 500. Rectangular pads 810 and 812 prevent the high-crown area 550 of the air-bearing surface 500 from contacting the disk 134. Each of the landing pads 800, 802, 810 and 812 helps prevent the main area or the main portion of the air-bearing surface 500 from coming in contact with the disk 134 when the slider 126 comes in contact with the disk. Rather the pads 800, 810, 802 and 812 contact the disk 134 when the slider 126 is positioned over the disk 134. All of the pads 530, 600, 602, 610, 612, 630, 632, 730, 800, 802, 810 and 812 are made of diamond-like carbon. The height of the all the pads is approximately in the range of 80 to 250 Angstroms. This height allows the pads to be the interface between the slider 126 and the surface of the disk 134. The pads can be deposited onto the air-bearing surface 500 of each of the sliders 126. The diamond-like carbon is durable and lasts the life of the drive. In addition landing pads of diamond-like carbon do not damage or cause minimal damage to the disk surface when the slider 126 comes in contact with the disk 134. Diamond-like carbon also does not outgas so contamination issues are not presented when diamond-like carbon is used. In operation, when the slider 126 is either loaded onto the disk 134 or unloaded from the disk 134 the idea is to avoid contact between the disk and the major portion of the air-bearing surface 500 of the slider 126. Since diamond-like carbon is a very good material to be in contact with the disk 134 since it tends not to damage the disk or wear the disk surface, the idea is to keep the landing pads 530, 600, 602, 610, 612, 630, 632, 730, 800, 802, 810 and 812 in contact with the disk 134. In addition, the speed of the slider 126 with respect to the disk 134 is also reduced so as to reduce any energy associated with a contact to a point where a contact will neither damage the disk 134 or the slider 126. The amount of energy that can be dissipated in a contact is proportional to the square of the velocity when the two masses are equal. In other words, given that a slider 126 of equal mass is being used the kinetic energy of a disk rotating at 200 RPM compared to a disk rotating at 10,000 RPM is the ratio of 10,000 over 200 squared. In other words, the relative velocity of the slider 126 with respect to the disk at 10,000 RPM is 250 times that of the kinetic energy of the slider when the disk is rotating at 200 RPM. As a result the reduction of the likelihood of damage is reduced by orders of magnitude by loading or unloading the slider from the disk at lower disk RPMs.

Figure 9:
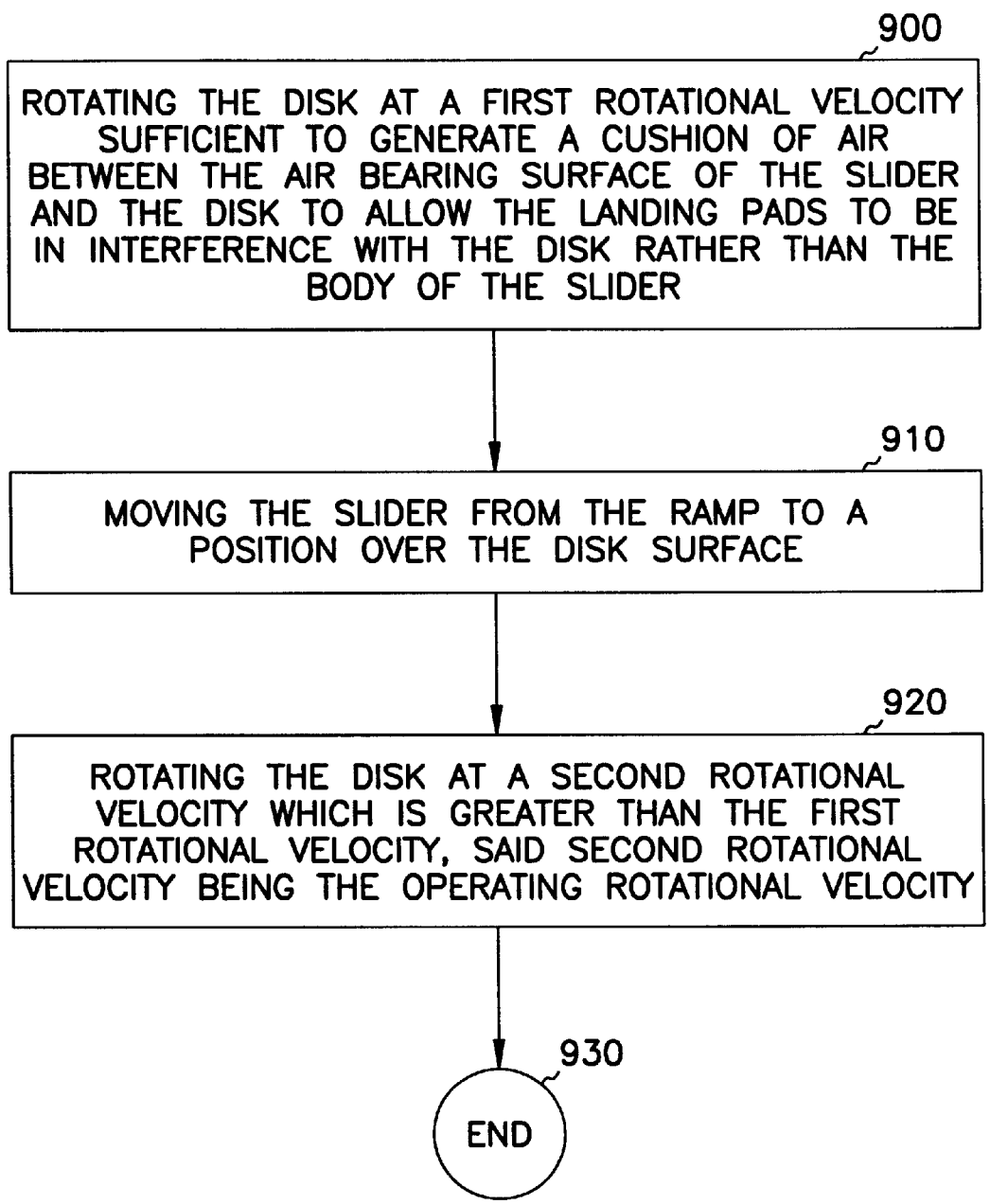
FIG. 9 is a flow chart showing the method used to load the slider onto the disk.
Figure 10:
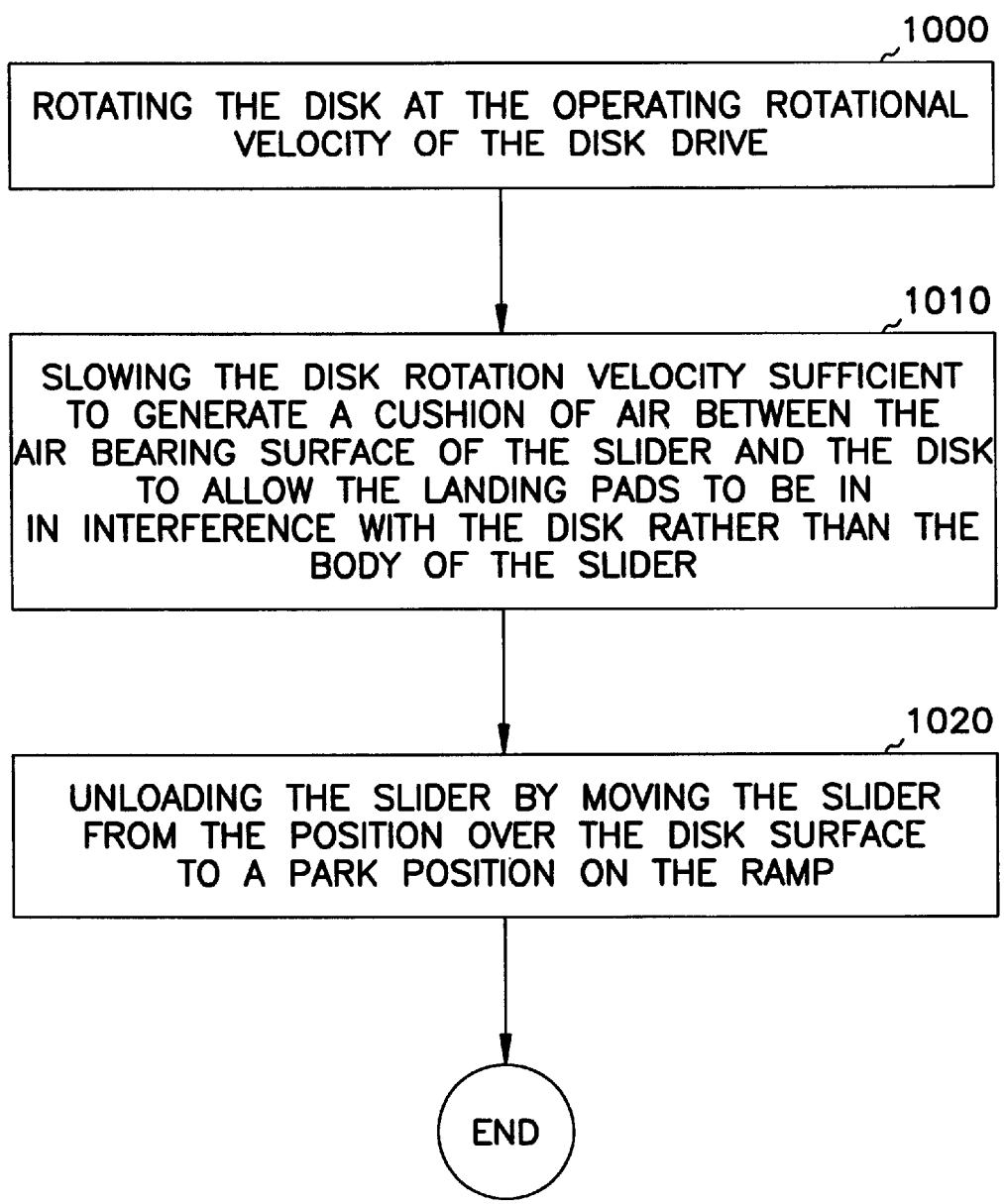
FIG. 10 is a flow chart showing the method used to unload the slider from the disk.

Now turning to FIGS. 9 and 10, a method used to load the slider onto the disk is discussed as well as a method for unloading the slider from the disk. FIG. 9 is a flowchart showing a method to load the slider 126 onto the disk 134. As shown at 900, the disk is first rotated at a first rotational velocity. First rotational velocity generates a cushion of air between the air-bearing surface 500, of the slider 126 and the disk 134. To allow the landing pads 530, 630, 632, 600, 602, 610, 612, 730, 800, 802, 810 and 812 to be in contact with the disk rather than the main portion of the air-bearing surface 500 of the slider 126. The first rotational disk velocity is in the range of 150 RPM to 1,000 RPM. More than likely the range of the first rotational velocity will be between 200 RPM and 300 RPM. Once the rotational speed of the disk 134 is achieved, a spindle motor controller (discussed in FIG. 11) sends a signal to the actuator controller which moves the actuator assembly 120 so that the slider is moved from the ramp 136 to a position over the disk 134 surface, as depicted at 910. Once the slider 126 has positioned over the disk 134 surface, the motor controller rotates the disk to a second rotational velocity as depicted by 920. The second rotational velocity is greater than the first rotational velocity. The second rotational velocity is generally the velocity at which the disk stack normally operates. For a high-performance drive this will be 10,000 RPM. Higher RPM are contemplated in the future for future high-performance applications. The essence of the method is that slider 126 is loaded onto the disk 134 surface as it is being rotated at a first rotational velocity which is much slower than the operating rotational velocity. As a result the landing pads 530, 600, 602, 610, 612, 630, 632, 730, 800, 802, 810 and 812 contact the disk 134 during loading. Since the velocity is low, the contact does not damage the disk 134 nor the slider 126. The landing pads are also made of a highly durable, long-wearing material such as diamond-like carbon which has been shown to have favorable wear characteristics when it contacts the disk surface.

FIG. 10 is a flowchart showing the method used to unload the slider 126 from the disk 134. At 1,000 the disk 134 is operating at it operational rotational velocity. When it is determined that the disk drive will shut down or that it is desirable to unload the slider 126 from the disk 134, the rotational speed or the rotational velocity of the disk 134 is slowed to a velocity sufficient to generate a cushion of air between the air-bearing surface 500 of the slider 126 and the disk 134. The slowed rotational velocity allows the landing pads 530, 600, 602, 610, 612, 630, 632, 730, 800, 802, 810 and 812 to contact the disk rather than the main portion of the air-bearing surface 500 of the slider 126. This is depicted at 1010. The slider 126 is then unloaded by moving the slider 126 from a position over the disk 134 to a parked position on the ramp 136, as depicted by 1020. Once the slider is parked on the ramp 136, the remaining portion of the shut-down procedure can be followed to shut down the disk drive. Again, the unloading at a slower velocity decreases the kinetic energy associated with the slider 126 so that if contact should occur between the slider 126 and the disk 134 little if any damage will result to either the slider 126 or the disk 134. The landing pads 530, 600, 602, 610, 612, 630, 632, 730, 800, 802, 810 and 812 prevent the main body or main portion of the air-bearing surface 500 of the slider 126 from contacting the disk 134. As a result the stiction force that is formed is not large and the stiction problems are virtually eliminated. In addition since the landing pads are made of a durable wear surface such as diamond-like carbon, the contact that occurs between the disk 134 and the slider 126 does not produce excessive wear to either the slider 126 or the disk 134.

Figure 11:
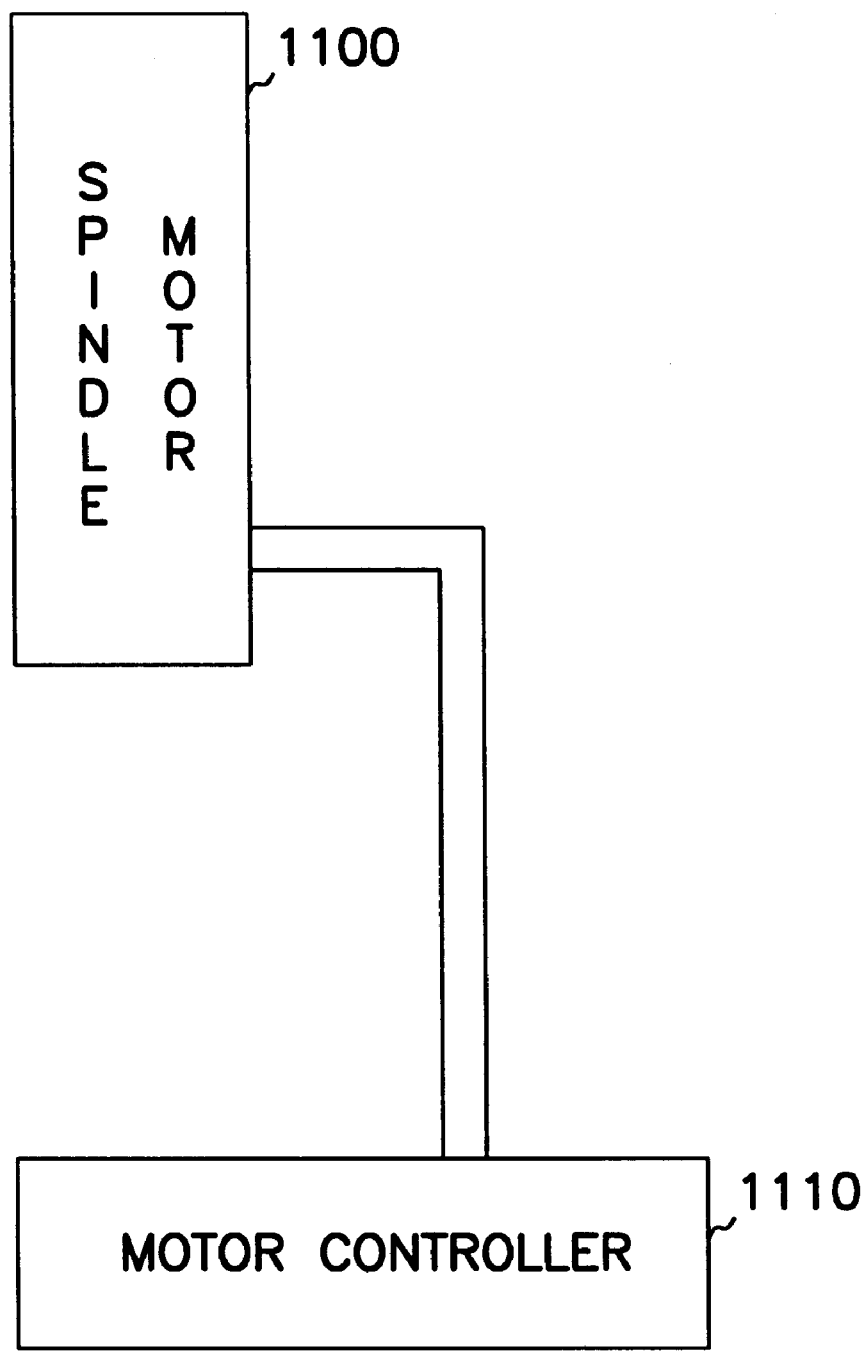
FIG. 11 is a schematic view of a motor and motor controller for a disk drive.

FIG. 11 is a schematic view of a motor, part of a spindle motor 1100 and a motor controller 1110 for the disk drive 100. The disk drive 100 is not shown in FIG. 11. The spindle motor rotates the disk 134 or rotates a plurality of disks 134. The spindle motor is usually housed within a hub to which the disks 134 are mounted. In some disk drives the spindle motor 1100 is not mounted inside the hub. A motor controller 1110 controls the speed at which the spindle motor 1100 rotates. The motor controller 1110 controls the current and the various windings and the spindle motor 1100. The motor controller controls the timing and therefore the direction and speed at which the magnetic field produced by coils in the spindle motor 1100 is rotated. By controlling the amount of current and the timing and the coils of the spindle motor 1100, the motor controller 1110 is able to control the speed at which the spindle motor 1100 and the attached disks 134 spin. The current velocity of the spinning hub and disks 134 are generally determined based upon servo information. Servo information is embedded in the disks 134 at specific radial locations so that the transducer 150 in the slider 126 can be properly positioned. Servo information can also be used to determine the speed at which a disk 134 is rotating by merely counting the frequency at which the servo bands appear underneath the transducer 150. There are of course other ways to determine the velocity or rotational velocity of the spindle motor and this particular method is discussed as a mere example. The motor controller 1110 can be part of a central processing unit or can be a special dedicated controller whose function it is to control the rotational velocity of the spindle motor 1100.

Servo information from the disk can also be used to determine when the transducer 150 and the slider 126 are in a proper position for loading, such as the outer diameter of the disk. The servo information can also be used to determine when the slider 126 and attached transducer 150 have been loaded onto the disk.

Advantageously, the method described above allows for loading the sliders onto the disk without causing damage to the disk, damage to the slider, particle generation or immediate or eventual head crashes. The method either avoids contact or minimizes the potential damage from contact by controlling the parameters which determine the severity of the contact between the disk and the slider. As a consequence, the amount of damage resulting from a contact is minimized. The slider is also provided with landing pads made of a durable material and shaped so that stiction between the major portion of the air bearing surface and the disk is minimized. The shape of the landing pads also eliminates damage to the disk surface. Advantageously, the landing pads are made of diamond like carbon. Diamond like carbon is easy deposited onto the air bearing surface of the slider. In addition, diamond like carbon is rugged and stable over time and is capable of lasting for the life of the drive. Diamond like carbon has minimal outgassing properties so that contaminants will not be added to the disk drive enclosure or contaminant the lubricant on the disk. The landing pads do not affect the gimballing of the slider with respect to the suspension.

Figure 12:
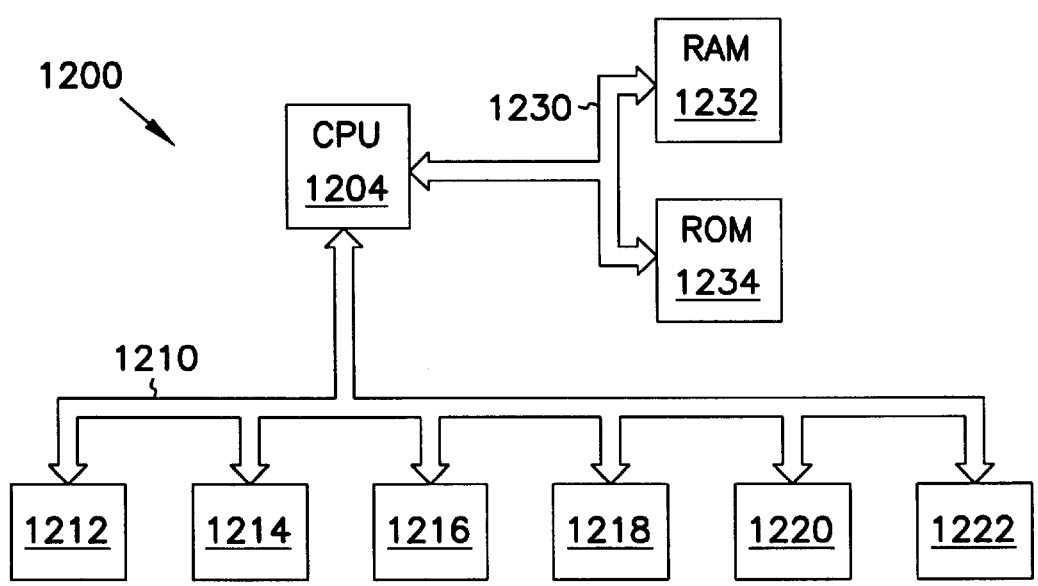
FIG. 12 is a schematic view of a computer system.

FIG. 12 is a schematic view of a computer system. Advantageously, the invention is well-suited for use in a computer system 1200. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The information handling system 1202 includes a disk drive device which includes the ramp described above. The information handling system 1202 may also include an input/output bus 1210 and several devices peripheral devices, such as 1212, 1214, 1216, 1218, 1220, and 1222 may be attached to the input output bus 1210. Peripheral devices may include hard disk drives, magneto optical drives, floppy disk drives, monitors, keyboards and other such peripherals. Any type of disk drive may use the method for loading or unloading the slider onto the disk surface as described above.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for loading a slider on the air bearing surface of the slider from a park position on a ramp beyond the circumference of a disk, to a disk surface, said method comprising:
    (a) rotating the disk at a first rotational velocity;
    (b) moving the slider from the park position on the ramp to a flying position over the disk surface while the disk rotates at the first velocity; and
    (c) rotating the disk at a second rotational velocity, wherein the second rotational velocity of step (c) is greater than the first rotational velocity of step (a).

2. The method of claim 1 wherein the first rotational velocity generates a cushion of air between the air bearing surface of the slider and the disk allowing the landing pads to be in interference with the disk rather than the body of the slider.

3. The method of claim 2 wherein the second rotational velocity is the operating velocity at which the disk rotates when the slider is in transducing relation with the disk.

4. The method of claim 3 wherein the second rotational velocity ranges between 4500 revolutions per minute to 10000 revolutions per minute.

5. The method of claim 1 wherein the first rotational velocity ranges between 150 revolutions per minute to 1000 revolutions per minute.

6. The method of claim 2 wherein the first rotational velocity ranges between 175 revolutions per minute to 500 revolutions per minute.

7. The method of claim 1 wherein the first rotational velocity ranges between 200 revolutions per minute to 350 revolutions per minute.

8. The method of claim 1 further comprising limiting the attitude of the slider.

9. An information handling system comprising:
    a base;
    a disk rotatably attached to said base; and
    an actuator assembly movably attached to said base, said actuator assembly further comprising a slider attached to said actuator assembly;
    a ramp attached to the base, said actuator assembly moving the slider between a position on the ramp beyond the circumference of the disk to a position adjacent the disk surface;
    means for rotating the disk at a first rotational velocity and a second velocity, said means rotating the disk at a first velocity as the actuator moves the slider from the ramp to a position adjacent the disk surface; and
    means for rotating the disk at a second rotational velocity after the slider is positioned adjacent the disk surface, wherein the means for rotating the disk at a second rotational velocity rotates the disk at a higher velocity than the means for rotating the disk at a first rotational velocity.

10. The information handling system of claim 9 wherein the slider further comprises:
    an air bearing surface; and
    landing pads formed on the air bearing surface, wherein means for rotating the disk at a first rotational velocity generates a cushion of air between the air bearing surface of the slider and the disk allowing the landing pads to be in interference with the disk rather than other portions of the air bearing surface of the slider.

11. The information handling system of claim 10 wherein the means for rotating the disk at a second rotational velocity rotates the disk in the range of 4500 to 15000 revolution per minute.

12. The information handling system of claim 10 wherein the slider further comprises a transducer for reading information from the disk and writing information to the disk, said means for rotating the disk at a second rotational velocity rotating the disk so that the slider can move from a first transducing position on a disk where the transducer is at a selected height above the disk to a second transducing position on a disk where the transducer is at a selected height above the disk.

13. A non contact start/stop disk drive apparatus comprising;
    a base;
    a disk rotatably attached to said base; and
    an actuator assembly movably attached to said base, said actuator assembly further comprising a slider attached to said actuator assembly;
    a ramp attached to the base, the actuator assembly moving the slider between a load position where the slider is in transducing relation with respect to the disk, and an unload position where the slider is positioned beyond the outer circumference of the disk on the ramp;
    a controller for rotating the disk at a first rotational velocity and a second rotational velocity, the controller rotating the disk at a first velocity while the actuator moves the slider from the unload position to the load position, the controller increasing the rotational velocity after the slider is placed in the load position.

14. The non contact start/stop disk drive of claim 13 wherein the first rotational velocity is sufficient to generate a cushion of air between an air bearing surface of the slider and the disk.

15. The non contact start/stop disk drive of claim 13 wherein the first rotational velocity is maintained for a selected amount of time.

16. The non contact start/stop disk drive of claim 13 wherein the first rotational velocity is maintained for a selected amount of time including at least the amount of time necessary for the actuator assembly to move the slider between the unload and the load position.

17. The non contact start/stop disk drive of claim 13 wherein both the first rotational velocity and the second rotational velocity are sufficient to generate a cushion of air between an air bearing surface of the slider and the disk.

18. A disk drive assembly comprising:

a base;

a disk rotatably attached to said base; and an actuator assembly movably attached to said base, said actuator assembly further comprising a slider attached to said actuator assembly;

a ramp attached to the base, the actuator assembly moving the slider between a load position where the slider is in transducing relation with respect to the disk, and an unload position; and means for reducing the amount of damage resulting from inadvertent contact caused by moving the slider between a load position, said means for reducing comprising means for rotating the disk at a first rotational velocity and a second rotational velocity, wherein when said slider is moved from said unload position to said load position, the means for reducing rotates the disk at said first rotational velocity, and when said slider is at said load position, said means for reducing rotates said disk at said second rotational velocity, wherein said second rotational velocity is greater than said first rotational velocity and an unload position.

* * * * *

UNITED STATES PATENT AND TRADEMARK OFFICE
CERTIFICATE OF CORRECTION

PATENT NO. : 6,243,222 B1
DATED : July 18, 2001
INVENTOR(S) : Zine Eddine Boutaghou, Dallas Wayne Meyer It is certified that error appears in the above-identified patent and that said Letters Patent is hereby corrected as shown below:

Column 4,
Line 36, "contaminant" should read -- contaminate --.
Line 52, insert -- is -- between "FIG. 7" and "a bottom".
Line 54, insert -- is -- between "FIG. 8" and "a bottom".

Column 8,
Line 65, insert -- , -- between "used" and "kinetic".

Column 9,
Line 46, "it" should read -- its --.
Lines 63-64, insert -- , -- between "134" and "little".

Column 10,
Line 1, insert -- , -- between "result" and "the stiction".
Line 3, insert -- , -- between "addition" and "since".
Line 63, "contaminant" should read -- contaminate --.

Column 11,
Line 11, delete "devices" between "several" and "peripheral".

Column 11, claim 2,
Line 40, insert -- surface of the -- between "the" and "disk"; and insert -- . -- after "disk".
Lines 40-42, delete "allowing the landing pads to be in interference with the disk rather than the body of the slider."

Column 11, claim 4,
Line 46, referenced claim No. "3" should read -- 2 --.

Column 11, claim 6,
Line 51, referenced claim No. "2" should read -- 1 --.

UNITED STATES PATENT AND TRADEMARK OFFICE
CERTIFICATE OF CORRECTION

PATENT NO. : 6,243,222 B1
DATED : July 18, 2001
INVENTOR(S) : Zine Eddine Boutaghou, Dallas Wayne Meyer It is certified that error appears in the above-identified patent and that said Letters Patent is hereby corrected as shown below:

Column 12,
Line 25, "revolution" should read -- revolutions --.

Column 14,
Line 3, insert -- and an unload position -- between "position" and ", said means".
Line 11, delete -- and an unload position --.

Signed and Sealed this

Nineteenth Day of February, 2002

Attest:

Attesting Officer

JAMES E. ROGAN
Director of the United States Patent and Trademark Office